(12) United States Patent
Maurer et al.

(10) Patent No.: US 10,501,634 B2
(45) Date of Patent: Dec. 10, 2019

(54) HIGH SOLIDS PRECIPITATED CALCIUM CARBONATE WITH CATIONIC ADDITIVE

(71) Applicant: Omya International AG, Oftringen (CH)

(72) Inventors: Marc Maurer, Village-Neuf (FR); Holger Spiegel, Villach (AT); Christian Jacquemet, Lyons (FR)

(73) Assignee: Omya International AG, Oftringen (CH)

( * ) Notice: Subject to any disclaimer, the term of this patent is extended or adjusted under 35 U.S.C. 154(b) by 10 days.

(21) Appl. No.: 15/544,968

(22) PCT Filed: Feb. 19, 2016

(86) PCT No.: PCT/EP2016/053544
§ 371 (c)(1),
(2) Date: Jul. 20, 2017

(87) PCT Pub. No.: WO2016/135059
PCT Pub. Date: Sep. 1, 2016

(65) Prior Publication Data
US 2018/0016439 A1    Jan. 18, 2018

Related U.S. Application Data

(60) Provisional application No. 62/149,745, filed on Apr. 20, 2015.

(30) Foreign Application Priority Data

Feb. 27, 2015    (EP) ..................... 15157025

(51) Int. Cl.
*C09C 1/02* (2006.01)
*C01F 11/18* (2006.01)
*C08K 3/26* (2006.01)

(52) U.S. Cl.
CPC ............ *C09C 1/021* (2013.01); *C01F 11/183* (2013.01); *C08K 3/26* (2013.01); *C01P 2006/22* (2013.01); *C08K 2003/265* (2013.01)

(58) Field of Classification Search
CPC ..... C01F 11/183; D21H 17/70; D21H 17/675; D21H 19/385; C01P 2006/22; C01P 2004/62; C01P 2004/61; C01P 2006/12
See application file for complete search history.

(56) References Cited

U.S. PATENT DOCUMENTS

| 5,232,678 | A | 8/1993 | Bleakley et al. |
| 5,558,850 | A | 9/1996 | Bleakley et al. |

(Continued)

FOREIGN PATENT DOCUMENTS

| CA | 2089004 | A1 * | 2/1992 | ............ B82Y 30/00 |
| EP | 0313483 | A1 | 4/1989 | |

(Continued)

OTHER PUBLICATIONS

Hu, Zeshan, and Yulin Deng. "Superhydrophobic surface fabricated from fatty acid-modified precipitated calcium carbonate." Industrial & Engineering Chemistry Research 49.12 (2010): 5625-5630.*

(Continued)

*Primary Examiner* — Richard M Rump
(74) *Attorney, Agent, or Firm* — Fay Sharpe LLP

(57) ABSTRACT

The present invention relates to a process for producing an aqueous suspension of precipitated calcium carbonate, an aqueous suspension of precipitated calcium carbonate and a precipitated calcium carbonate obtained by the process, a process comprising the precipitated calcium carbonate and its use.

15 Claims, 1 Drawing Sheet

(56) References Cited

U.S. PATENT DOCUMENTS

| | | | |
|---|---|---|---|
| 5,731,034 A | 3/1998 | Husband | |
| 5,827,398 A * | 10/1998 | Depasquale | D21H 23/765 162/164.1 |
| 6,294,143 B1 | 9/2001 | Deutsch et al. | |
| 2011/0135560 A1 * | 6/2011 | Guillot | C01F 11/182 423/432 |
| 2011/0158890 A1 | 6/2011 | Gane et al. | |
| 2014/0140907 A1 | 5/2014 | Belli et al. | |
| 2014/0186241 A1 | 7/2014 | Pohl et al. | |
| 2014/0366777 A1 | 12/2014 | Skrzypczak et al. | |
| 2018/0273395 A1 * | 9/2018 | Jacquemet | C01F 11/183 |

FOREIGN PATENT DOCUMENTS

| | | | |
|---|---|---|---|
| EP | 0844213 A1 | 5/1998 | |
| EP | 2157136 A1 | 2/2010 | |
| EP | 2371766 A1 | 10/2011 | |
| EP | 2447213 A1 | 5/2012 | |
| EP | 2524898 A1 | 11/2012 | |
| EP | 2537900 A1 | 12/2012 | |
| JP | 2008074629 A | 4/2008 | |
| JP | 2011073899 A | 4/2011 | |
| KR | 100958593 B1 | 5/2010 | |
| WO | 9210609 A1 | 6/1992 | |
| WO | 2004106236 A1 | 12/2004 | |
| WO | 2005000742 A1 | 1/2005 | |
| WO | 2007067146 A1 | 6/2007 | |
| WO | 2010018432 A1 | 2/2010 | |
| WO | 2010093092 A1 | 8/2010 | |
| WO | 2010106111 A1 | 9/2010 | |
| WO | 2011121065 A1 | 10/2011 | |
| WO | WO2012/156231 | 11/2012 | |
| WO | WO-2012156231 A1 * | 11/2012 | B82Y 30/00 |
| WO | WO2012/175490 | 12/2012 | |
| WO | WO-2012175490 A1 * | 12/2012 | C01F 11/181 |
| WO | 2013142473 A1 | 9/2013 | |

OTHER PUBLICATIONS

The International Search Report dated Apr. 21, 2016 for PCT/EP2016/053544.

The Written Opinion of the International Searching Authority dated Apr. 21, 2016 for PCT/EP2016/053544.

* cited by examiner

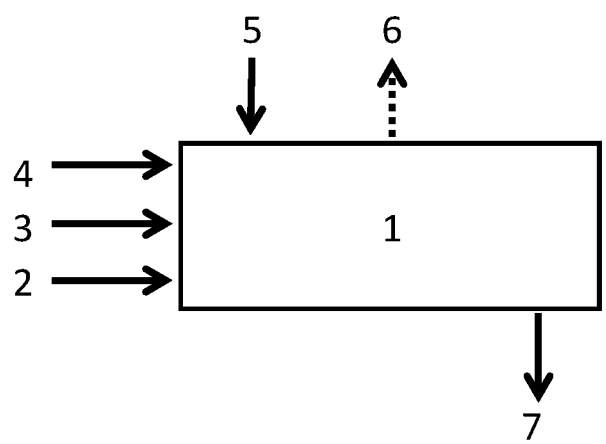

HIGH SOLIDS PRECIPITATED CALCIUM CARBONATE WITH CATIONIC ADDITIVE

CROSS-REFERENCE TO RELATED APPLICATIONS

This is a U.S. national phase of PCT Application No. PCT/EP2016/053544, filed Feb. 19, 2016, which claims priority to European Application No. 15157025.6, filed Feb. 27, 2015 and U.S. Provisional Application No. 62/149,745, filed Apr. 20, 2015.

The present invention relates to a process for producing an aqueous suspension of precipitated calcium carbonate, an aqueous suspension of precipitated calcium carbonate and a precipitated calcium carbonate obtained by the process, a process comprising the precipitated calcium carbonate and its use.

Calcium carbonate is one of the most commonly used additives in the paper, paint and plastics industries. While naturally occurring ground calcium carbonate (GCC) is usually used as a filler in many applications, synthetically manufactured precipitated calcium carbonate (PCC) may be tailor-made with respect to its morphology and particle size allowing this materials to fulfil additional functions.

Commonly known PCC production processes including the steps of slaking quicklime with water, and subsequently precipitating calcium carbonate by passing carbon dioxide through the resulting calcium hydroxide suspension, produce only PCC slurries with low solids content. Therefore, these processes typically comprise a subsequent solids concentration step in order to obtain a more concentrated PCC slurry, for example, for shipping the PCC slurry. However, such additional solids concentration steps are energy-consuming and cost-intensive and require equipment such as a centrifuge, which is expensive and needs high maintenance. Furthermore, mechanical dewatering processes using centrifuges can destroy the structure of the formed PCC, for example, in case of clustered scalenohedral PCC.

WO 2011/121065 A1 discloses a process for preparing PCC comprising inter alia the step of preparing an aqueous suspension of PCC seeds by carbonating a suspension of calcium hydroxide in the presence of strontium hydroxide. A process for producing PCC, wherein the addition rate of the calcium carbonate slurry to the reaction vessel is such that a certain electrical conductivity is maintained in the reaction vessel, is described in EP 2 537 900 A1.

US 2011/158890 A1 describes a method to manufacture PCC involving the use of a comb polymer, which reduces the carbonation time of the PCC. A grinding agent for grinding coarse lime is disclosed in EP 0 313 483 A1. EP 2 447 213 A1 relates to the production of high purity PCC involving the step of slaking lime with an aqueous ammonium chloride solution.

WO 2013/142473 A1 relates to a process comprising the steps of preparing slaking quick lime to obtain slaked lime, and subjecting the slaked lime, without agitation, without prior cooling in a heat exchanger, and in the absence of any additives, to carbonation with carbon dioxide gas to produce PCC. PCC production processes including additives are disclosed in U.S. Pat. Nos. 6,294,143, 5,232,678, and 5,558,850. A method for producing slaked lime by slaking lime with a polymer having anionic groups is described in JP 2008/074629 A. EP 0 844 213 A1 discloses a method of producing a precipitate of an alkaline earth metal compound involving the use of a dispersing agent.

WO 2010/018432 A1 discloses a process to prepare precipitated calcium carbonate implementing low charge acrylate and/or maleinate-containing polymers. A process for producing platy precipitated calcium carbonate involving the step of adding a polyacrylate to a suspension of calcium hydroxide prior to the completion of carbonation is described in WO 2005/000742 A1. WO 2004/106236 A1 relates to a process for producing platy precipitated calcium carbonate involving the step of adding a dry condensed phosphate additive to a suspension of calcium hydroxide prior to the completion of carbonation.

It is further known from applicants' unpublished application EP 14 166 751.9 that an aqueous suspension of precipitated calcium carbonate can be prepared by carbonating a milk of lime, which has been obtained by mixing water, a calcium oxide containing material, at least one water-soluble polymer having a molecular weight $M_w$ in the range from 200 to 6 500 g/mol, and at least one slaking additive, wherein the calcium oxide containing material and the water are mixed in a weight ratio from 1:2.5 to 1:6. The at least one water-soluble polymer has the chemical structure of formula (I)

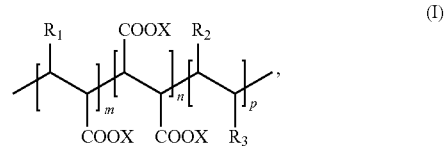

wherein n, m, and p are integers and at least one of n, m, or p is greater than zero and n+m+p is less than or equal to 70,
$R_1$ is H or $CH_3$,
$R_2$ is H or $CH_3$,
$R_3$ is $-C(=O)-O-R_4$ or $-C(=O)-NH-R_4$, wherein $R_4$ is a $C_1$ to $C_{20}$ alkyl group, a $C_3$ to $C_{20}$ cycloalkyl group and/or a $C_6$ to $C_{30}$ aryl group, being optionally substituted with one or more sulfonate groups, and wherein the cycloalkyl group and/or the aryl group comprises one ring or several rings, which are linked to each other, and
X is H and/or M, wherein M is Na, K, Li, Mg, and/or Ca, and wherein the structural units

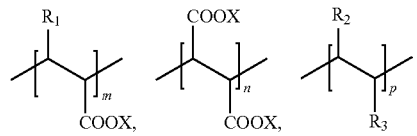

are arranged randomly, regularly and/or in blocks.

A method for preparing calcium carbonate using additives and precipitation agents is also known from KR100958593 B1. The method comprises an elution step of adding, into a container equipped with an agitator, a lime-based byproduct comprising steel-making slag or quick lime (CaO) dust, water at a ratio of 20 to 50 l per 60 to 100 g of the lime-based byproduct, at least one additive selected from the group consisting of sodium trimetaphosphate, sodium hexametaphosphate, sodium polycarbonate, ammonium polycarbonate, sodium polycarboxylate, formic acid, succinic acid, sucrose fatty acid ester, sodium citrate, ammonium citrate, and ammonium chloride in an amount of 0.01 to 10.0 parts by weight with respect to 100 parts by weight of the lime-based byproduct, and at least one precipitating agent selected from the group consisting of a cationic precipitating agent, an anionic precipitating agent, and a nonionic precipitating agent in an amount of 0.01 to 3.0 parts by weight with respect to 100 parts by weight of the lime-based byproduct and performing a mixing, to elute calcium ions; a precipitation step of standing the resulting mixture for a predetermined period of time after the completion of mixing the lime-based byproduct, water, the additive, and the precipitating agent in the elution step to precipitate the lime-based byproduct; a carbonation step of separating a clear supernatant eluate after the completion of the precipitation step and then feeding carbon dioxide into the eluate to cause a reaction until the eluate is at pH 9; and a calcium carbonate collection step of collecting calcium carbonate precipitated on the bottom after the completion of the carbonation step.

However, said methods have the drawback that an additive in combination with a precipitating agent has to be added to the calcium oxide comprising material. Furthermore, especially in KR100958593 B1, it is described that the obtained mixture is separated in a precipitated bottom portion and a clear supernatant eluate. The carbonating and the resulting precipitation of calcium carbonate is then only carried out on the obtained clear supernatant eluate in order to obtain a calcium carbonate product comprising less impurities. Thus, said method requires additional separation steps allowing a separation of solid and liquid phase during processing which results in a more time and cost-consuming production of precipitated calcium carbonate.

Furthermore, it is to be noted that the precipitation agent is used in said method for adsorbing the slurry suspended in water to coagulate and precipitate the slurry through cross-linking, which enables a rapid solid-liquid separation. However, due to the following separation of the liquid and solid phases and carbonating of only the liquid phase, i.e. the clear supernatant eluate, the precipitation agent is not present in the carbonating step and is thus not used for the following precipitation of calcium carbonate.

WO 2007/067146 A1 refers to a method of producing precipitated calcium carbonate (PCC), for use as a filler in paper or paper board production, comprising the steps of; providing a suspension of calcium hydroxide, carbonating said suspension of calcium hydroxide, wherein said step of carbonating said calcium hydroxide is performed in the presence of starch and/or carboxy methyl cellulose. It is further described that the starch and/or carboxy methyl cellulose is preferably added to the calcium hydroxide suspension. This step differs from the process of the present invention. Especially, the present process for producing an aqueous suspension of precipitated calcium carbonate requires that the at least one cationic polymer is mixed with the calcium oxide containing material and water to obtain a milk of lime.

In view of the foregoing, there is a continuous need for processes providing precipitated calcium carbonate, and especially those which allow the direct production of PCC suspensions with a high solids content without an additional separation or concentration step.

Accordingly, it is an object of the present invention to provide a process for producing a PCC suspension with a high solids content at an acceptable viscosity. It is also desirable that said process does not require any mechanical or thermal concentration step during processing. It is also desirable that said process does not require any separation step during processing, especially before the milk of lime is carbonated. It is also desirable that said process does not affect the kinetics of the carbonation step in a negative way and/or does not impair the crystallographic structure of the PCC.

The foregoing and other objects are solved by the subject-matter as defined herein in the independent claims.

According to one aspect of the present invention, a process for producing an aqueous suspension of precipitated calcium carbonate is provided, the process comprises the steps of:
i) providing a calcium oxide containing material,
ii) providing at least one cationic polymer,
iii) preparing a milk of lime by mixing water, the calcium oxide containing material of step i), and the at least one cationic polymer of step ii) to obtain a milk of lime, wherein the calcium oxide containing material and the water are mixed in a weight ratio from 1:1 to 1:12, and
iv) carbonating the milk of lime obtained in step iii) to form an aqueous suspension of precipitated calcium carbonate.

According to another aspect, the present invention provides an aqueous suspension of precipitated calcium carbonate obtainable by the process according to the present invention.

According to still another aspect, the present invention provides a precipitated calcium carbonate obtainable by the process according to the present invention.

According to a further aspect, a product comprising the precipitated calcium carbonate according to the present invention is provided, preferably the product is a paper, a paper product, an ink, a paint, a coating, a plastic, a polymer composition, an adhesive, a building product, a foodstuff, an agricultural product, a cosmetic product or a pharmaceutical product.

According to still another aspect, a use of the aqueous suspension of precipitated calcium carbonate according to the present invention and/or the precipitated calcium carbonate according to the present invention in paper, plastics, polymer compositions, paint, coatings, concrete, cosmetics, pharmaceutics and/or agriculture applications is provided.

Advantages embodiment of the present invention are defined in the corresponding sub-claims.

According to one embodiment, step iii) comprises the steps of:
a1) mixing the at least one cationic polymer of step ii) with water, and a2) adding the calcium oxide containing material of step i) to the mixture of step a1); or
b1) mixing the calcium oxide containing material of step i), and the at least one cationic polymer of step ii), and b2) adding water to the mixture of step b1); or
c) mixing the calcium oxide containing material of step i), the at least one cationic polymer of step ii) and water simultaneously.

According to another embodiment, the process further comprises step v) of adding at least one slaking additive to process step iii), preferably the at least one slaking additive is selected from the group consisting of organic acids, organic acid salts, sugar alcohols, monosaccharides, disaccharides, polysaccharides, gluconates, phosphonates, lignosulfonates, and mixtures thereof.

According to yet another embodiment, the milk of lime obtained in step iii) has a Brookfield viscosity from 1 to 1 000 mPa·s at 25° C., more preferably from 5 and 800 mPa·s at 25° C., and most preferably from 10 and 500 mPa·s at 25° C.; and/or the suspension of PCC obtained in step iv) has a Brookfield viscosity of less than or equal to 1 600 mPa·s at 25° C., more preferably less than or equal to 1 500 mPa·s at 25° C., and most preferably less than or equal to 1 400 mPa·s at 25° C.

According to one embodiment, the suspension of PCC obtained in step iv) has a solids content of at least 15 wt.-%, preferably from 15 to 70 wt.-%, more preferably from 19 to 60 wt.-%, even more preferably from 21 to 50 wt.-% and most preferably from 24 to 42 wt.-%, based on the total weight of the suspension.

According to another embodiment, the temperature of the water, which is used in mixing step iii), is adjusted to be in the range from more than 0° C. and less than 100° C., preferably from 1° C. to 75° C., more preferably from 2° C. to 70° C., even more preferably from 30° C. to 65° C., and most preferably from 35 to 55° C.; and/or the temperature of the milk of lime obtained in step iii), which is employed in step iv), is adjusted to be in the range from 20° C. to 60° C., and preferably from 30° C. to 50° C.

According to yet another embodiment, the at least one cationic polymer is a polymeric amine, preferably a quaternized ammonium compound.

According to one embodiment, the at least one cationic polymer is
- a) a homopolymer based on monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), or
- b) a copolymer based on monomer and comonomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), or
- c) a copolymer based on monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS) and comonomer units selected from acrylic acid and methacrylic acid.

According to another embodiment, the at least one cationic polymer has a specific viscosity in the range from 1.2 to 15.0, preferably from 1.4 to 13.0, more preferably from 1.5 to 11.0 and most preferably from 1.65 to 10.0; and/or has a positive charge density in the range of from >0 µVal/g to +15 µVal/g, more preferably in the range of +1 µVal/g to +10 µVal/g and most preferably in the range of +1 µVal/g to +7 µVal/g.

According to yet another embodiment, the process further comprises step vi) of separating the precipitated calcium carbonate from the aqueous suspension obtained in step iv).

It should be understood that for the purpose of the present invention, the following terms have the following meaning:

A "calcium oxide containing material" in the meaning of the present invention can be a mineral or a synthetic material having a content of calcium oxide of at least 50 wt.-%, preferably 75 wt.-%, more preferably 90 wt.-%, and most preferably 95 wt.-%, based on the total weight of the calcium oxide containing material. For the purpose of the present invention, a "mineral material" is a solid substance having a definite inorganic chemical composition and characteristic crystalline and/or amorphous structure.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionation, for example by a cyclone or classifier.

Throughout the present document, the "particle size" of precipitated calcium carbonate or other particulate materials is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{98}$ value is the particle size at which 98 wt.-% of all particles are smaller. The $d_{98}$ value is also designated as "top cut". The $d_{50}$ value is thus the weight median particle size, i.e. 50 wt.-% of all grains are bigger or smaller than this particle size. For the purpose of the present invention the particle size is specified as weight median particle size $d_{50}$ unless indicated otherwise. For determining the weight median particle size $d_{50}$ value or the top cut particle size $d_{98}$ value a Sedigraph 5100 or 5120 device from the company Micromeritics, USA, can be used.

"Precipitated calcium carbonate" (PCC) in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate for example, in an aqueous environment. PCC may be vaterite, calcite or aragonite. PCCs are described, for example, in EP 2 447 213 A1, EP 2 524 898 A1, EP 2 371 766 A1, or unpublished European patent application no. 12 164 041.1.

A "suspension" or "slurry" in the meaning of the present invention comprises insoluble solids and water, and optionally further additives, and usually contains large amounts of solids and, thus, is more viscous and can be of higher density than the liquid from which it is formed.

For the purpose of the present invention, the "solids content" of a liquid composition such as a suspension or slurry is a measure of the amount of material remaining after all the solvent or water has been evaporated.

The term "cationic polymer" in the meaning of the present invention refers to a polymer having a positive overall charge. Thus, the presence of anionic monomer units is not excluded as long as there are still sufficient cationic monomer units providing a positive overall charge. Furthermore, the cationic polymer may be further treated e.g. with a neutralization agent such as to obtain a partially or totally neutralized polymer. Thus, it is to be noted that the term "cationic polymer" refers to the base polymer, i.e. the polymer before it is further treated with a neutralization agent.

A "specific BET surface area" (SSA) in the meaning of the present invention is defined as the surface area of the precipitated calcium carbonate particles divided by the mass of PCC particles. As used therein the specific surface area is measured by adsorption using the BET isotherm (ISO 9277: 1995) and is specified in $m^2/g$.

In the meaning of the present invention, "stable in an aqueous suspension having a pH of 12 and a temperature of 95° C." means that the polymer maintains its physical properties and chemical structure when added to an aqueous suspension having a pH of 12 and a temperature of 95° C. For example, the polymer maintains its dispersing qualities and is not depolymerized or degraded under said conditions.

For the purpose of the present invention, the term "viscosity" or "Brookfield viscosity" refers to Brookfield viscosity. The Brookfield viscosity is for this purpose measured by a Brookfield (Type RVT) viscometer at 25° C.±1° C. at 100 rpm using an appropriate spindle and is specified in mPa·s.

Unless specified otherwise, the term "drying" refers to a process according to which at least a portion of water is removed from a material to be dried such that a constant weight of the obtained "dried" material at 120° C. is reached. Moreover, a "dried" material may be further defined by its total moisture content which, unless specified otherwise, is less than or equal to 1.0 wt.-%, preferably less than or equal to 0.5 wt.-%, more preferably less than or equal to 0.2 wt.-%, and most preferably between 0.03 and 0.07 wt.-%, based on the total weight of the dried material.

The "total moisture content" of a material refers to the percentage of moisture (i.e. water) which may be desorbed from a sample upon heating to 220° C.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This, for example, means that, unless the context clearly dictates otherwise, the term "obtained" does not mean to indicate that e.g. an embodiment must be obtained by, e.g. the sequence of steps following the term "obtained" even though such a limited understanding is always included by the terms "obtained" or "defined" as a preferred embodiment.

The inventive process for producing an aqueous suspension of precipitated calcium carbonate comprises the steps of process for producing an aqueous suspension of precipitated calcium carbonate comprising the steps of i) providing a calcium oxide containing material, ii) providing at least one cationic polymer, iii) preparing a milk of lime by mixing water, the calcium oxide containing material of step i), and the at least one cationic polymer of step ii) to obtain a milk of lime, and iv) carbonating the milk of lime obtained from step iii) to form an aqueous suspension of precipitated calcium carbonate. In process step iii), the calcium oxide containing material and the water are mixed in a weight ratio from 1:1 to 1:12.

In the following details and preferred embodiments of the inventive process will be set out in more details. It is to be understood that these technical details and embodiments also apply to the inventive use as well as to the inventive products and their use.

Characterization of Step i): Provision of a Calcium Oxide Containing Material

According to step i) of the process of the present invention, a calcium oxide containing material is provided.

The calcium oxide containing material of step i) can be obtained by calcining a calcium carbonate containing material. Calcination is a thermal treatment process applied to calcium carbonate containing materials in order to bring about a thermal decomposition resulting in the formation of calcium oxide and gaseous carbon dioxide. Calcium carbonate containing materials which may be used in such a calcinations process are those selected from the group comprising precipitated calcium carbonates; natural calcium carbonate containing minerals such as marble, limestone and chalk, and mixed alkaline earth carbonate minerals comprising calcium carbonate such as dolomite, or calcium carbonate rich fractions from other sources. It is also possible to subject a calcium carbonate containing waste material to a calcinations process in order to obtain a calcium oxide containing material.

Calcium carbonate decomposes at about 1 000° C. to calcium oxide (commonly known as quicklime). The calcination step may be carried out under conditions and using equipment well-known to the person skilled in the art. Generally, calcination may be carried out in furnaces or reactors (sometimes referred to as kilns) of various designs including shaft furnaces, rotary kilns, multiple hearth furnaces, and fluidized bed reactors.

The end of the calcination reaction may be determined, e.g. by monitoring the density change, the residual carbonate content, e.g. by X-ray diffraction, or the slaking reactivity by common methods.

According to one embodiment of the present invention, the calcium oxide containing material of step i) is obtained by calcining a calcium carbonate containing material, preferably selected from the group consisting of precipitated calcium carbonate, natural calcium carbonate minerals such as marble, limestone and chalk, mixed alkaline earth carbonate minerals comprising calcium carbonate such as dolomite, and mixtures thereof.

For reasons of efficiency, it is preferred that the calcium oxide containing material has a minimum calcium oxide content of at least 75 wt.-%, preferably at least 90 wt.-%, and most preferably 95 wt.-%, based on the total weight of the calcium oxide containing material. According to one embodiment, the calcium oxide containing material consists of calcium oxide.

The calcium oxide containing material can consist of only one type of calcium oxide containing material. Alternatively, the calcium oxide containing material can consist of a mixture of two or more types of calcium oxide containing materials.

The calcium oxide containing material can be used in the inventive process in its original form, i.e. as a raw material, for example, in form of smaller and bigger chunks. Alternatively, the calcium oxide containing material can be ground before use. According to one embodiment of the present invention, the calcium carbonate containing material is in forms of particles having weight median particle size $d_{50}$ from 0.1 to 1 000 μm, and preferably from 1 to 500 μm.

Characterization of Step ii): Provision of at Least One Cationic Polymer

According to step ii) of the process of the present invention, at least one cationic polymer is provided.

The term "at least one" cationic polymer in the meaning of the present invention means that the cationic polymer comprises, preferably consists of, one or more cationic polymer(s).

In one embodiment of the present invention, the at least one cationic polymer comprises, preferably consists of, one cationic polymer. Alternatively, the at least one cationic polymer comprises, preferably consists of, two or more cationic polymers. For example, the at least one cationic polymer comprises, preferably consists of, two cationic polymers.

Preferably, the at least one cationic polymer comprises, more preferably consists of, one cationic polymer.

It is preferred that the at least one cationic polymer of step ii) is a polymeric amine. For example, the at least one cationic polymer of step ii) is a quaternized ammonium compound. Thus, it is appreciated that the at least one cationic polymer comprises, preferably consists of, monomer units being a quaternized ammonium compound.

In one embodiment, the at least one cationic polymer of step ii) comprises, preferably consists of, monomer units being a quaternized ammonium compound of the chemical structure of formula (Ia) or (Ib)

wherein $R_1$ is a $C_1$ to $C_{18}$ alkyl group;

n is an integer in the range from 1 to 6;

X is O or NH; and $R_2$ is a $C_2$ to $C_{10}$ alkenyl group.

In one embodiment, the at least one cationic polymer of step ii) comprises, preferably consists of, monomer units being a quaternized ammonium compound of the chemical structure of formula (Ia)

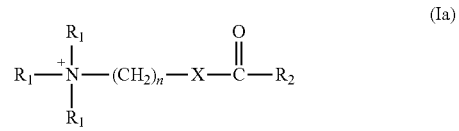

wherein $R_1$ is a $C_1$ to $C_6$ alkyl group;

n is an integer in the range from 1 to 4;

X is O or NH; and $R_2$ is a $C_2$ to $C_6$ alkenyl group such as a vinyl, a propenyl, an isopropenyl, a butenyl, a pentenyl or a hexenyl group.

Preferably, the at least one cationic polymer of step ii) comprises, preferably consists of, monomer units being a quaternized ammonium compound of the chemical structure of formula (Ia)

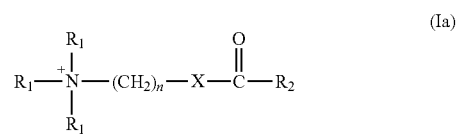

wherein $R_1$ is a $C_1$ or $C_2$ alkyl group, more preferably a methyl group;

n is an integer in the range from 2 to 4;

X is O or NH; and $R_2$ is a $C_2$ to $C_4$ alkenyl group, such as a vinyl, a propenyl, an isopropenyl or a butenyl group, more preferably a vinyl or isopropenyl group.

In an alternative embodiment, the at least one cationic polymer of step ii) comprises, preferably consists of, monomer units being a quaternized ammonium compound of the chemical structure of formula (Ib)

wherein $R_1$ is a $C_1$ to $C_6$ alkyl group; and $R_2$ is a $C_2$ to $C_6$ alkenyl group such as a vinyl, a propenyl, an isopropenyl, a butenyl, a pentenyl or a hexenyl group.

Preferably, the at least one cationic polymer of step ii) comprises, preferably consists of, monomer units being a quaternized ammonium compound of the chemical structure of formula (Ib),

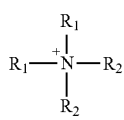

(Ib)

wherein $R_1$ is a $C_1$ or $C_2$ alkyl group, more preferably a methyl group; and $R_2$ is a $C_2$ to $C_4$ alkenyl group such as a vinyl, propenyl, isopropenyl or butenyl group, preferably a propenyl group.

For example, the at least one cationic polymer of step ii) comprises, preferably consists of, monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS).

In an alternative embodiment, the at least one cationic polymer of step ii) includes monomers selected from dimethylaminoethylacrylate, dimethylaminoethylmethacrylate, dimethylamino propylmethacrylamide and its methyl chloride or dimethyl sulfate quaternary ammonium salts, dimethylaminoethylacrylate and its methyl chloride salt, methacrylamidopropyltrimethylammonium chloride and its unquaternized amine form, acrylamidopropyltrimethylammonium chloride and its unquaternized amine form, and dimethylamine and epichlorohydrin.

For example the at least one cationic polymer of step ii) is a homopolymer based on monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS).

For example, the at least one cationic polymer of step ii) is a homopolymer selected from poly(diallyldimethyl ammonium chloride) (pDADMAC) and poly(2-methacryloxyethyltrimethylammonium chloride) (pMADQUAT).

It is appreciated that the expression homopolymer used in the present invention relates to a cationic polymer that consists substantially, i.e. of at least 99.5 wt.-%, based on the total weight of the cationic polymer, preferably of at least 99.6 wt.-%, more preferably of at least 99.8 wt.-%, of one kind of monomer units. In one embodiment of the present invention, only one kind of monomer units is detectable in the at least one cationic polymer.

In an alternative embodiment, the at least one cationic polymer of step ii) is a copolymer, preferably a random copolymer or a block copolymer.

If the at least one cationic polymer of step ii) is a copolymer, the comonomer content in the copolymer is preferably relatively high, i.e. ≤50.0 wt.-%, based on the total weight of the copolymer. In one embodiment of the present invention, the comonomer content is preferably between 5.0 and 50.0 wt.-%, more preferably between 10.0 wt.-% and 50.0 wt.-%, even more preferably between 20.0 wt.-% and 50.0 wt.-% and most preferably between 30.0 wt.-% and 50.0 wt.-%, based on the total weight of the copolymer. For example, the comonomer content is about 30.0 wt.-% or about 50.0 wt.-%, based on the total weight of the copolymer.

In one embodiment, the at least one cationic polymer of step ii) is a copolymer based on monomer and comonomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS).

For example, the at least one cationic polymer of step ii) is a copolymer based on monomer units selected from 2-(methacryloyloxy)-ethyltrimethylammonium chloride (MADQUAT) and comonomer units selected from 3-(methacrylamidopropyl)-trimethylammonium chloride (MAPTAC).

In case the monomer units as well as the comonomer units are selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), the comonomer content is preferably of about 30.0 wt.-%, based on the total weight of the copolymer.

It is also possible that the at least one cationic polymer of step ii) comprises monomer units selected from the above-mentioned monomer units in combination with non-ionic or anionic comonomer units such that the overall charge of the polymer is cationic.

In this case, the comonomer units are preferably non-ionic monomers selected from the goup consisting of acrylamide, methacrylamide, N,N-dimethylacrylamide, vinyl acetate, vinyl alcohol, N-methylolacrylamide, and diacetone acrylamide; and/or anionic monomers selected from the group consisting of acrylic acid, methacrylic acid, AMPS, and maleic acid.

In one embodiment, the comonomer units are non-ionic monomers selected from acrylamide, methacrylamide and N,N-dimethylacrylamide; and/or anionic monomers selected from acrylic acid and methacrylic acid. Preferably, the comonomer units are anionic monomers selected from acrylic acid and methacrylic acid.

In one embodiment, the at least one cationic polymer of step ii) is thus a copolymer based on monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), and comonomer units selected from acrylic acid and methacrylic acid.

For example, the at least one cationic polymer of step ii) is a copolymer based on monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), and comonomer units being acrylic acid.

Preferably, the at least one cationic polymer of step ii) is a copolymer based on monomer units selected from the group consisting of allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), and comonomer units being acrylic acid.

Alternatively, the at least one cationic polymer of step ii) is a copolymer based on monomer units selected from the group consisting of vinyl-based dialkyl ammonium compounds, allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); vinyl-based trialkyl ammonium compounds such as [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), and comonomer units being methacrylic acid.

Preferably, the at least one cationic polymer of step ii) is a copolymer based on monomer units selected from the group consisting of allyl-based dialkyl ammonium compounds such as diallyldimethyl ammonium chloride (DADMAC), diallyldiethyl ammonium chloride (DADEAC), diallyldimethyl ammonium bromide (DADMAB) or diallyldiethyl ammonium bromide (DADEAB); and allyl-based trialkyl ammonium compounds such as 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), and comonomer units being methacrylic acid.

For example, the at least one cationic polymer of step ii) is a copolymer based on monomer units selected from 2-(methacryloyloxy)-ethyltrimethylammonium chloride (MADQUAT) and comonomer units selected from acrylic acid.

In case the comonomer units are selected from non-ionic monomers and anionic monomers, the comonomer content is preferably of about 50.0 wt.-%, based on the total weight of the copolymer.

Alternatively, the at least one cationic polymer of step ii) is a copolymer of quaternary dimethylaminoethyl acrylate, or a copolymer of quaternary dimethylaminoethyl methacrylate, or a copolymer of epichlorohydrin/dimethylamine (EPIIDMA).

The at least one cationic polymer of step ii) can be obtained by methods of radical polymerisation in solution, in a direct or reverse emulsion, in suspension or precipitation in appropriate solvents, in the presence of known catalytic systems and chain transfer agents, or again by methods of controlled radical polymerisation, and preferentially by nitroxide-mediated polymerisation (NMP) or by cobaloximes-mediated polymerization, by atom transfer radical polymerisation (ATRP), by controlled radical polymerisation by sulphurated derivatives, chosen from among carbamates, dithioesters or trithiocarbonates (RAFT) or xanthates.

The at least one cationic polymer of step ii), can be partially or totally neutralized. According to one embodiment, the at least one cationic polymer is partially or totally neutralized by at least one neutralization agent having a monovalent or polyvalent anion. The at least one neutralization agent can be selected from the group consisting of sodium fluoride, sodium chloride, sodium bromide, sodium iodide, potassium fluoride, potassium chloride, potassium bromide, potassium iodide, sodium hydrogen sulfate, potassium hydrogen sulfate, sodium nitrite, sodium methyl sulfate and mixtures thereof.

It is appreciated that the neutralization rate of the at least one cationic polymer can be in the range from 1 to 99 mole-%, preferably in the range from 50 to 98 mole-%, more preferably in the range from 70 to 97 mole-% and most preferably of about 95 mole-%.

In one embodiment, the at least one cationic polymer is partially or totally neutralized by a monovalent anion, preferably chloride, bromide or methosulfate, more preferably chloride or bromide and most preferably chloride.

Preferably, the at least one cationic polymer is a at least one water-soluble cationic polymer, preferably at least one water soluble polymeric amine and most preferably at least one water-soluble quaternized ammonium compound.

For the purpose of the present application, "water-insoluble" materials are defined as materials which, when mixed with deionised water and filtered on a filter having a 0.2 µm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate. It is appreciated that more than 0.1 g of material is used to determine the content of water-insoluble or water-soluble materials.

According to the present invention, the at least one cationic polymer defined above is added during step iii) of the inventive process for producing PCC, i.e. the polymer is added during the slaking step. As known to the skilled person, the milk of lime obtained by slaking a calcium oxide containing material with water has usually a pH value between 11 and 12.5 at a temperature of 25° C., depending on the concentration of the calcium oxide containing material in the milk of lime. Since the slaking reaction is exothermic, the temperature of the milk of lime typically raises to a temperature between 80 and 99° C. According to one embodiment of the present invention, the at least one cationic polymer of step ii) is selected such that it is stable in an aqueous suspension having a pH of 12 and a temperature of 95° C. In the meaning of the present invention, "stable in an aqueous suspension having a pH of 12 and a temperature of 95° C." means that the polymer maintains its physical properties and chemical structure when added to an aqueous suspension having a pH of 12 and a temperature of 95° C. For example, the at least one cationic polymer maintains its dispersing qualities and is not depolymerized or degraded under said conditions. The absence of any depolymerization or degradation of the polymer may be determined by measuring the amount of free monomers in the milk of lime and/or the obtained aqueous PCC suspension. According to one embodiment of the present invention, the amount of free monomers in the milk of lime is below 0.1 wt.-%, preferably below 0.05 wt.-%, more preferably below 0.01 wt.-%, and most preferably below 0.005 wt.-%, based on the total amount of the at least one at least one cationic polymer provided in step ii).

According to one embodiment of the present invention, the at least one cationic polymer is in its neutralized or partially neutralized form.

According to one embodiment of the present invention, the at least one cationic polymer of step ii) has a weight average molecular weight $M_w$ in the range from 1 000 to 5 000 000 g/mol, preferably from 10 000 to 5 000 000 g/mol, more preferably from 100 000 to 5 000 000 g/mol and most preferably from 1 000 000 to 5 000 000 g/mol. The molecular weight $M_w$ may be determined by gel permeation chromatography.

In one embodiment, the at least one cationic polymer of step ii) has a positive charge density in the range of >0 µVal/g and +15 µVal/g. Preferably, the at least one cationic polymer of step ii) has a positive charge density in the range of +1 µVal/g and +10 µVal/g and most preferably in the range of +1 µVal/g and +7 µVal/g. It is appreciated that the positive charge density refers to the charge as measured by the method of Mütek.

Additionally or alternatively, the at least one cationic polymer of step ii) has a specific viscosity in the range from 1.2 to 15.0. Preferably, the at least one cationic polymer of step ii) has a specific viscosity in the range from 1.4 to 13.0, more preferably from 1.5 to 11.0 and most preferably from 1.65 to 10.0.

According to one embodiment of the present invention, the at least one cationic polymer of step ii) is added in an amount from 0.01 to 0.5 wt.-%, preferably from 0.02 to 0.4 wt.-%, and more preferably from 0.05 to 0.35 wt.-%, based on the total weight of the calcium oxide containing material.

The at least one cationic polymer of step ii) can be provided in form of a solution or as a dry material. According to one embodiment, the at least one cationic polymer of step ii) is provided in form of a solution. According to another embodiment of the present invention, the at least one cationic polymer of step ii) is provided in form of an aqueous solution having a polymer concentration from 1 to 70 wt.-%, and preferably from 2 to 60 wt.-%, based on the total weight of the aqueous solution.

Characterization of Step iii): Preparing a Milk of Lime

According to step iii) of the process of the present invention, a milk of lime is prepared by mixing water, the calcium oxide containing material of step i), and the at least one cationic polymer of step ii) to obtain a milk of lime, wherein the calcium oxide containing material and the water are mixed in a weight ratio from 1:1 to 1:12.

The reaction of the calcium oxide containing material with water results in the formation of a milky calcium hydroxide suspension, better known as milk of lime. Said reaction is highly exothermic and is also designated as "lime slaking" in the art.

According to one embodiment of the present invention, the temperature of the water, which is used in mixing step iii), i.e. the temperature of the water that is used to slake the calcium oxide containing material, is adjusted to be in the range from more than 0° C. and less than 100° C. In other words, the water that is used to slake the calcium oxide containing material is adjusted to a temperature range, in which the water is in liquid form. Preferably, the temperature of the water, which is employed in mixing step iii) is adjusted to be from 1° C. to 85° C., more preferably from 2° C. to 70° C., even more preferably from 30° C. to 65° C., and most preferably from 35 to 55° C. It will be apparent to the skilled person that the initial temperature of the water is not necessarily the same one as the temperature of the mixture prepared in step iii) due to the highly exothermic slaking reaction and/or due to the mixing of substances having different temperatures.

According to one embodiment of the present invention, process step iii) comprises the steps of:
 a1) mixing the at least one cationic polymer of step ii) with water, and
 a2) adding the calcium oxide containing material of step i) to the mixture of step a1).

According to one embodiment, step a1) is carried out at a temperature from more than 0° C. to 99° C., preferably from 1° C. to 75° C., more preferably from 2° C. to 70° C., even more preferably from 30° C. to 65° C., and most preferably from 35 to 55° C.

According to another embodiment of the present invention, process step iii) comprises the steps of:
 b1) mixing the calcium oxide containing material of step i), and the at least one cationic polymer of step ii), and
 b2) adding water to the mixture of step b1).

According to still another embodiment of the present invention, in process step iii) the calcium oxide containing material of step i), the at least one cationic polymer of step ii), and water are mixed simultaneously.

The at least one cationic polymer of step ii) may be added in step iii) in one portion or in several portions. According to one embodiment, in step iii) the at least one cationic polymer of step ii) is mixed with the water, and the calcium oxide containing material of step i), by adding the at least one cationic polymer in one portion or in two, three, four, five, or more portions.

Process step iii) may be performed at room temperature, i.e. at a temperature of 20° C.±2° C., or at an initial temperature of 30 to 50°, preferably 35 to 45° C. Since the reaction is exothermic, the temperature typically raises to a temperature between 85 and 99° C. during step iii), preferably to a temperature between 90 and 95° C. According to a preferred embodiment, process step iii) is performed under mixing, agitation, or stirring, for example, mechanical stirring. Suitable process equipment for mixing, agitation or stirring is known to the skilled person.

The progress of the slaking reaction may be observed by measuring the temperature and/or conductivity of the reaction mixture. It can also be monitored by turbidity control. Alternatively or additionally, the progress of the slaking reaction can be inspected visually.

Conventional methods for preparing PCC suffer from the problem that the milk of lime can only be processed at low solids content since the milk of lime becomes very viscous at higher solids content during the slaking process. In a typical PCC production process of the prior art, the weight ratio of calcium oxide to water is less than 1:6, usually 1:9 or 1:10. The inventors surprisingly found that the addition of a combination of a water-soluble cationic polymer as defined above, before or during the slaking step of a process for producing PCC can allow the preparation of a milk of lime with a high solids content. By carbonating said highly concentrated milk of lime, an aqueous suspension of PCC can be obtained which has also a high solids content. As a result, the process of the present invention does not require an additional up-concentration step in order to obtain a PCC suspension with a high solids content.

According to the present invention, the calcium oxide containing material and the water are mixed in a weight ratio from 1:1 to 1:12. According to one preferred embodiment, in step iii) the calcium oxide containing material and the water are mixed in a weight ratio from 1:1 to 1:9, more preferably from 1:2.5 to 1:5.

According to one embodiment of the present invention, the milk of lime of step iii) has a solids content of at least 8 wt.-%, preferably from 10 to 66 wt.-%, more preferably from 12 to 66 wt.-%, even more preferably from 15 to 55 wt.-%, and most preferably from 17 to 45 wt.-%, such as from 20 to 38 wt.-%, based on the total weight of the milk of lime.

According to one embodiment of the present invention, the milk of lime of step iii) has a Brookfield viscosity from 1 to 1 000 mPa·s at 25° C., more preferably from 5 and 800 mPa·s at 25° C., and most preferably from 10 and 500 mPa·s at 25° C. According to one embodiment, the Brookfield viscosity is measured at 100 rpm.

It is within the confines of the present invention that additional water may be introduced during the slaking reaction in order to control and/or maintain and/or achieve the desired solids content or Brookfield viscosity of the milk of lime.

In one embodiment, the process further comprises step v) of adding at least one slaking additive to process step iii).

According to one embodiment of the present invention, the at least one slaking additive is selected from the group consisting of organic acids, organic acid salts, sugar alcohols, monosaccharides, disaccharides, polysaccharides, gluconates, phosphonates, lignosulfonates, and mixtures thereof.

For example, the at least one slaking additive is selected from the group consisting of sodium citrate, potassium citrate, calcium citrate, magnesium citrate, monosaccharides, disaccharides, polysaccharides, sucrose, sugar alcohols, meritol, citric acid, sorbitol, sodium salt of diethylene triamine pentaacetic acid, gluconates, phosphonates, sodium tartrate, sodium lignosulfonate, calcium lignosulfonate, and mixtures thereof.

According to a preferred embodiment, the at least one slaking additive is sodium citrate and/or saccharose.

According to one embodiment of the present invention, the at least one slaking additive consists of one type of slaking additive only. Alternatively, the at least one slaking additive can consist of a mixture of two or more types of slaking additives.

The at least one slaking additive may be provided in an amount from 0.01 to 2.0 wt.-%, based on the total amount of calcium oxide containing material, preferably in an amount from 0.05 to 1.0 wt.-%, more preferably from 0.06 to 0.8 wt.-%, and most preferably from 0.07 to 0.5 wt.-%.

By adding a slaking additive, the size of the PCC particles and their crystal morphology can be controlled without affecting the viscosity of the aqueous suspension.

If the process of the present invention comprises a step of adding at least one slaking additive to process step iii), the process step iii) preferably comprises the steps of:

a1) mixing the at least one cationic polymer of step ii) and the at least one slaking additive with water, and a2) adding the calcium oxide containing material of step i) to the mixture of step a1).

Alternatively, process step iii) comprises the steps of:

b1) mixing the calcium oxide containing material of step i), the at least one cationic polymer of step ii), and the at least one slaking additive, and b2) adding water to the mixture of step b1).

Alternatively, in process step iii) the calcium oxide containing material of step i), the at least one cationic polymer of step ii), the at least one slaking additive, and water are mixed simultaneously.

According to still another embodiment of the present invention, the at least one slaking additive is added before or after step iii) of the inventive process.

Process step iii) can be carried out in form of a batch process, a semi-continuous or a continuous process. FIG. 1 shows an example of a continuous process step iii). The at least on polymer (2), the optional slaking additive (3), water (4), and a calcium oxide containing material (5) are fed into a slaker (1). The reaction heat (6) resulting from the exothermic slaking reaction is dissipated and the obtained milk of lime is discharged (7) to the next process stage, for example, the carbonation stage or a screening stage.

Characterization of Step iv): Carbonating the Milk of Lime

According to step iv) of the process of the present invention, the milk of lime obtained from step iii) is carbonated to form an aqueous suspension of precipitated calcium carbonate.

The carbonation is carried out by means and under conditions well-known by the person skilled in the art. The introduction of carbon dioxide into the milk of lime quickly increases the carbonate ion ($CO_3^{2-}$) concentration and calcium carbonate is formed. Particularly, the carbonation reaction can be readily controlled considering the reactions involved in the carbonation process. Carbon dioxide dissolves according to its partial pressure forming carbonate ions via the formation of carbonic acid ($H_2CO_3$), and hydrogen carbonate ions ($HCO_3^-$) being unstable in the alkaline solution. Upon continued dissolution of carbon dioxide, hydroxide ions are consumed and the concentration of carbonate ions increases until the concentration of dissolved calcium carbonate exceeds the solubility product and solid calcium carbonate precipitates.

According to one embodiment of the present invention, in step iv) the carbonation is carried out by feeding pure gaseous carbon dioxide or technical gases containing at least 10 vol.-% of carbon dioxide into the milk of lime.

The progress of the carbonation reaction can be readily observed by measuring the conductivity density, turbidity and/or pH. In this respect, the pH of the milk of lime before addition of carbon dioxide will be more than 10, usually between 11 and 12.5, and will constantly decrease until a pH of about 7 is reached. At this point the reaction can be stopped.

Conductivity slowly decreases during the carbonation reaction and rapidly decreases to low levels, when the precipitation is completed. The progress of the carbonation may be monitored by measuring the pH and/or the conductivity of the reaction mixture.

According to one embodiment of the present invention, the temperature of the milk of lime obtained from step iii), which is used in step iv) is adjusted to be in the range from 20° C. to 60° C., and preferably from 30° C. to 50° C. It will be apparent to the skilled person that the initial temperature of the milk of lime, is not necessarily the same one as the temperature of the mixture prepared in step iv) due to the exothermic carbonation reaction and/or due to the mixing of substances having different temperatures.

According to one embodiment of the present invention, step iv) is carried out at a temperature from 5 to 95° C., preferably from 30 to 70° C., and more preferably from 40 to 60° C.

Process step iv) can be carried out in form of a batch process, a semi-continuous or a continuous process. According to one embodiment, the process of the present invention involving the process steps i) to iv) is carried out in form of a batch process, a semi-continuous or a continuous process.

According to one embodiment of the present invention, the process of the present invention does not comprise a step of up-concentrating the aqueous suspension of precipitated calcium carbonate obtained by steps i) to iv) of the inventive process. Additionally or alternatively, the process of the present invention does not comprise a step of separating the liquid phase from the solids content in the suspension obtained in step iii), i.e. there is no step of separating carried out between steps iii) and iv) of the inventive process.

As already mentioned above, the inventors surprisingly found that the addition of at least one cationic polymer as defined above before or during the slaking step of a process for producing PCC can allow the preparation of a PCC suspension with a high solids content. It is also believed that the omission of an up-concentration step improves the quality of the produced PCC particles, since surface damages of the particles, which can occur during the up-concentration step, are avoided. It was also found that said PCC suspension can be further up-concentrated to a solids contents of about 70 wt.-% at acceptable viscosities, for example, to Brookfield viscosities of less than or equal to 1 600 mPa·s at 25° C. and 100 rpm. Typically, this cannot be done with PCC suspensions that are obtained by conventional PCC production processes including an up-concentrating step because the viscosity of said suspension would raise to a non-pumpable range.

According to one embodiment of the present invention, the obtained precipitated calcium carbonate has a weight median particle size $d_{50}$ from 0.1 to 100 μm, preferably from 0.25 to 50 μm, more preferably from 0.3 to 5 μm, and most preferably from 0.4 to 3.0 μm.

The precipitated calcium carbonate may have aragonitic, calcitic, or vateritic crystal structure, or mixtures thereof. It is a further advantage of the present invention that the crystal structure and morphology of the precipitated calcium carbonate can be controlled, e.g. by addition of seed crystals or other structure modifying chemicals. According to a preferred embodiment, the precipitated calcium carbonate obtained by the inventive process has a clustered scalenohedral crystal structure.

The BET specific surface area of the precipitated calcium carbonate obtained by the process according to the present invention may be from 1 to 100 m²/g, preferably from 2 to 70 m²/g, more preferably from 3 to 50 m²/g, especially from 4 to 30 m²/g, measured using nitrogen and the BET method according to ISO 9277. The BET specific surface area of the precipitated calcium carbonate obtained by the process of the present invention may be controlled by the use of additives, e.g. surface active agents, shearing during the precipitation step or thereafter at high mechanical shearing rates not only leading to a low particle size, but also to a high BET specific surface area.

According to one embodiment of the present invention, the suspension of precipitated calcium carbonate obtained in step iv) has preferably a solids content of at least 15 wt.-%, preferably from 15 to 70 wt.-%, more preferably from 19 to 60 wt.-%, even more preferably from 21 to 50 wt.-% and most preferably from 24 to 42 wt.-%, based on the total weight of the suspension.

According to one embodiment of the present invention, the suspension of PCC of step iv) has a Brookfield viscosity of less than or equal to 1 600 mPa·s at 25° C., more preferably less than or equal to 1 500 mPa·s at 25° C., and most preferably less than or equal to 1 400 mPa·s at 25° C. The Brookfield viscosity is measured at 100 rpm.

In one embodiment of the present application, the milk of lime may be screened in order to remove oversize particles. A suitable screen can include, for example, a screen having a sieve size from 700 to 100 µm, for example, about 100 or about 300 µm. According to one embodiment of the present invention, the milk of lime is screened after step iii) and before step iv), preferably with a screen having a sieve size from 100 to 300 µm. It is to be noted that such a screening step is to be distinguished from a separating step as only particles of a specific size are removed. In contrast thereto, a separating step essentially completely removes the solids from an aqueous suspension.

It is possible to separate the precipitated calcium carbonate from the aqueous suspension obtained in step iv). In one embodiment, the process according to the present invention comprising the steps i) to iv), and optionally step v), thus further comprises step vi) of separating the precipitated calcium carbonate from the aqueous suspension obtained in step iv).

For the purpose of the present invention, the expression "separating" means that the PCC is removed or isolated from the aqueous suspension obtained from step iv) of the inventive process. The precipitated calcium carbonate obtained from step iv) may be separated from the mother liquor by any conventional means of separation known to the skilled person. According to one embodiment of the present invention, in process step vi) the PCC is separated mechanically and/or thermally. Examples for mechanical separation processes are filtration, e.g. by means of a drum filter or filter press, nanofiltration, or centrifugation. An example for a thermal separation process is an up-concentration process by the application of heat, for example, in an evaporator. According to a preferred embodiment, in process step vi) the PCC is separated mechanically, preferably by filtration and/or centrifugation.

It is also preferred that the mother liquor obtained after precipitation and/or any one of the reactants may be recycled into the process.

The obtained PCC may be further processed, e.g., may be deagglomerated or subjected to a dry grinding step. Otherwise, it may also be wet ground in form of a suspension. If the PCC is subjected to dewatering, dispersion and/or grinding steps, these steps may be accomplished by procedures known in the art. Wet grinding may be carried out in the absence of a grinding aid or in the presence of a grinding aid. One or more grinding agents can be included, such as, e.g., sodium polyacrylate, a salt of polyacrylate acid, and/or a salt of a copolymer of acrylic acid. Dispersants also can be included to prepare dispersions if desired.

In one embodiment, the separated precipitated calcium carbonate obtained from step vi) is dried in drying step vii).

In general, the drying step vii) may take place using any suitable drying equipment and can, for example, include thermal drying and/or drying at reduced pressure using equipment such as an evaporator, a flash drier, an oven, a spray drier and/or drying in a vacuum chamber.

According to one embodiment, drying step vii) is a spray drying step, preferably said spray drying step is carried out at a lower temperature ranging from 90° C. to 130° C. and preferably from 100° C. to 120° C. By means of drying step vii), a dried precipitated calcium carbonate is obtained having a low total moisture content which is less than or equal to 1.0 wt.-%, based on the total weight of the dried precipitated calcium carbonate.

According to another embodiment, the dried PCC of step vii) has a total moisture content of less than or equal to 0.5 wt.-% and preferably less than or equal to 0.2 wt.-%, based on the total weight of the dried precipitated calcium carbonate. According to still another embodiment, the dried PCC of step vii) has a total moisture content of between 0.01 and 0.15 wt.-%, preferably between 0.02 and 0.10 wt.-%, and more preferably between 0.03 and 0.07 wt.-%, based on the total weight of the dried precipitated calcium carbonate.

The precipitated calcium carbonate obtained by the inventive process can be post-treated, for example, during and/or after a drying step with an additional component.

According to one embodiment the precipitated calcium carbonate is treated with a fatty acid, e.g. stearic acid, a silane, or phosphoric esters of fatty acids.

Products and their Use

According to the present invention, an aqueous suspension of precipitated calcium carbonate is provided, which is obtainable by a process comprising the steps of:
i) providing a calcium oxide containing material,
ii) providing at least one cationic polymer,
iii) preparing a milk of lime by mixing water, the calcium oxide containing material of step i), and the at least one cationic polymer of step ii) to obtain a milk of lime, wherein the calcium oxide containing material and the water are mixed in a weight ratio from 1:1 to 1:12, and
iv) carbonating the milk of lime obtained from step iii) to form an aqueous suspension of precipitated calcium carbonate, and
v) optionally adding at least one slaking additive to process step iii).

According to a further aspect of the present invention, a precipitated calcium carbonate is provided, which is obtainable by a process comprising the steps of:
i) providing a calcium oxide containing material,
ii) providing at least one cationic polymer,
iii) preparing a milk of lime by mixing water, the calcium oxide containing material of step i), and the at least one cationic polymer of step ii) to obtain a milk of lime, wherein the calcium oxide containing material and the water are mixed in a weight ratio from 1:1 to 1:12,
iv) carbonating the milk of lime obtained from step iii) to form an aqueous suspension of precipitated calcium carbonate,
v) optionally adding at least one slaking additive to process step iii), and
vi) separating the precipitated calcium carbonate from the aqueous suspension obtained from step iv).

The PCC suspension and/or PCC obtained by the process of the present invention may be used in various materials. According to one embodiment of the present invention, the precipitated calcium carbonate according to the present invention is used in paper, plastics, polymer compositions, paint, coatings, concrete, cosmetics, pharmaceutics and/or agriculture applications. According to another embodiment of the present invention, the aqueous suspension of precipitated calcium carbonate according to the present invention is used in paper, plastics, polymer compositions, paint, coatings, concrete, cosmetics, pharmaceutics and/or agriculture applications.

According to one aspect of the present invention, a product comprising the precipitated calcium carbonate according to the present invention is provided. According to a preferred embodiment, the product is a paper, a paper product, an ink, a paint, a coating, a plastic, a polymer composition, an adhesive, a building product, a foodstuff, an agricultural product, a cosmetic product or a pharmaceutical product.

According to still a further aspect of the present invention, a dried precipitated calcium carbonate is provided, which is obtainable by a process comprising the steps of:
  i) providing a calcium oxide containing material,
  ii) providing at least one cationic polymer,
  iii) preparing a milk of lime by mixing water, the calcium oxide containing material of step i), and the at least one cationic polymer of step ii) to obtain a milk of lime, wherein the calcium oxide containing material and the water are mixed in a weight ratio from 1:1 to 1:12,
  iv) carbonating the milk of lime obtained from step iii) to form an aqueous suspension of precipitated calcium carbonate,
  v) optionally adding at least one slaking additive to process step iii),
  vi) separating the precipitated calcium carbonate from the aqueous suspension obtained from step iv), and
  vii) drying the separated precipitated calcium carbonate obtained from step vi).

According to a preferred embodiment, the dried precipitated calcium carbonate obtainable from process steps i) to vii) is a dried powder of precipitated calcium carbonate.

The dried PCC obtainable from process steps i) to vii) may be used in paper, plastics, polymer compositions, paint, coatings, concrete, cosmetics, pharmaceutics and/or agriculture applications. According to a preferred embodiment, the dried precipitated calcium carbonate is used in plastics and/or polymer compositions. For example, said PCC may be used in thermoplastic polymers, such as polyvinyl chloride, polyolefins, and polystyrene. Moreover, the dried PCC may also be used in polymer coatings which may be applied on the surface of polymer articles, such as foils, in order to increase the hydrophobicity (e.g., reflected by an increased contact angle measured against water) of said surface.

According to one aspect of the present invention, a product comprising dried precipitated calcium carbonate according to the present invention, preferably a dried powder of said precipitated calcium carbonate, is provided. According to one embodiment, the product is a paper, a paper product, an ink, a paint, a coating, a plastic, a polymer composition, an adhesive, a building product, a foodstuff, an agricultural product, a cosmetic product or a pharmaceutical product. According to a preferred embodiment, a product comprising a dried precipitated calcium carbonate is provided, wherein the product is a plastic or a polymer composition.

The scope and interest of the present invention will be better understood based on the following FIGURES and examples which are intended to illustrate certain embodiments of the present invention and are non-limitative.

DESCRIPTION OF THE FIGURE

FIG. 1 is a sketch of a continuous slaking process.

EXAMPLES

1. Measurement Methods

In the following, measurement methods implemented in the examples are described.

Brookfield Viscosity

The Brookfield viscosity of the liquid coating compositions was measured after one hour of production and after one minute of stirring at 25° C.±1° C. at 100 rpm by the use of a Brookfield viscometer type RVT equipped with an appropriate disc spindle, for example spindle 2 to 5.

pH Value

The pH of a suspension or solution was measured at 25° C. using a Mettler Toledo Seven Easy pH meter and a Mettler Toledo InLab® Expert Pro pH electrode. A three point calibration (according to the segment method) of the instrument was first made using commercially available buffer solutions having pH values of 4, 7 and 10 at 20° C. (from Sigma-Aldrich Corp., USA). The reported pH values are the endpoint values detected by the instrument (the endpoint was when the measured signal differed by less than 0.1 mV from the average over the last 6 seconds).

Particle Size Distribution

The particle size distribution of the prepared PCC particles was measured using a Sedigraph 5120 from the company Micromeritics, USA. The method and the instrument are known to the skilled person and are commonly used to determine grain size of fillers and pigments. The measurement was carried out in an aqueous solution comprising 0.1 wt.-% $Na_4P_2O_7$. The samples were dispersed using a high speed stirrer and supersonics. For the measurement of dispersed samples, no further dispersing agents were added.

Solids Content of an Aqueous Suspension

The suspension solids content (also known as "dry weight") was determined using a Moisture Analyser MJ33 from the company Mettler-Toledo, Switzerland, with the following settings: drying temperature of 160° C., automatic switch off if the mass does not change more than 1 mg over a period of 30 sec, standard drying of 5 to 20 g of suspension.

Specific Surface Area (SSA)

The specific surface area was measured via the BET method according to ISO 9277 using nitrogen, following conditioning of the sample by heating at 250° C. for a period of 30 minutes. Prior to such measurements, the sample is filtered within a Buchner funnel, rinsed with deionised water and dried overnight at 90 to 100° C. in an oven. Subsequently the dry cake is ground thoroughly in a mortar and the resulting powder placed in a moisture balance at 130° C. until a constant weight is reached.

Specific Carbonation Time

The monitoring of the conductivity, which slowly decreases during the carbonation reaction and rapidly decreases to a minimal level, thereby indicating the end of the reaction, was used to assess the time needed to perform the complete precipitation. The specific carbonation time (min/kg $Ca(OH)_2$) was determined by the following formula:

$$\text{Specific carbonation time} = \frac{10^5 \cdot Tf}{M \cdot SC_{MoL}}$$

wherein:

Tf (min) is the time needed to complete the carbonation of the milk of lime, as determined by monitoring the conductivity, M (g) is the weight of the milk of lime introduced into the carbonation reactor, and $SC_{MoL}$ (%) is the weight solids content of the milk of lime.

Specific Viscosity

The term "specific viscosity" in the meaning of the present invention is defined as the difference of the relative viscosity minus 1:

$$\eta_{sp}=\eta_{rel}-1$$

The relative viscosity as used herein is the quotient of the solution viscosity and the solvent viscosity:

$$\eta_{rel} = \frac{\eta}{\eta_0}$$

wherein the solvent viscosity $\eta_0$ is defined as the viscosity of the pure solvent and the solution viscosity $\eta$ is defined as the viscosity of the polymer dissolved in the pure solvent.

However, to determine the relative viscosity it is sufficient to measure the elution time t (of the solution) and $t_0$ (of the solvent) at a given temperature if the boundary conditions are constant. Therefore, the relative viscosity may be defined as $$\eta_{rel} = \frac{t}{t_0}$$

and, thus, the specific viscosity may be defined as:

$$\eta_{sp} = \frac{t}{t_0} - 1$$

More precisely, the specific viscosity of the polymer was obtained from an aqueous polymer solution with a polymer concentration of 50 g/L in NaCl solution (120 g/L), the pH of the polymer solution being possibly adjusted with ammonia to be within the range of 6 to 7. The elution time t and $t_0$ was measured at 25° C.+/−0.2, using a viscosimetric tube USA KIMAX (reference: size 100 n° 46460 B2).

$t_0$: In order to determine $t_0$, an aqueous NaCl solution was prepared by using reverse osmosis water, the NaCl solution having a concentration of 120 g/L.

t: In order to determine t, about 2.5 g of the polymer was combined with 50 g of reverse osmosis water and 6 g of NaCl in order to obtain a solution.

The elution time t and $t_0$ was measured at 25° C.±0.2° C. and $\eta_{sp}$ was calculated according to the above mentioned formulas.

Charge Measurement—Mütek

The charge measurement was carried out using a Mütek PCD 03 device equipped with a Mütek PCD titrator.

About 1 g of the PCC suspension is weighed in the plastic measuring cell and is diluted with 20 mL of deionised water. Put the displacement piston on. While the piston oscillates in the cell, wait until the streaming current between the two electrodes stabilize.

The sign of the measured value shown on the display indicates whether the charge of the sample is positive (cationic) or negative (anionic). An oppositely charged polyelectrolyte of known charge density is added to the sample as a titrant (either sodium polyoxyethylene sulfate 0.001 N or pDADMAC 0.001 N). The titrant charges neutralize existing charges of the sample. Titration is discontinued as soon as the point of zero charge (0 mV) is reached.

Titrant consumption in mL forms the basis for further calculations. The specific charge quantity q [µVal/g of sly] is calculated according to the following formula:

$$q=(V\times c)/m$$

V: consumed titrant volume [l]

c: titrant concentration [µVal/l]

m: mass of the weighed slurry [g]

q: specific charge quantity [µVal/g of slurry]

Zeta Potential

For measuring the Zeta potential, a few drops of the PCC suspensions are dispersed in a sufficient quantity of serum obtained by mechanical filtration of the said suspension in order to obtain a colloidal suspension which is slightly cloudy.

This suspension is introduced into the measuring cell of the Zetasizer Nano-ZS from Malvern, which directly displays the value of the Zeta potential of the PCC suspension in mV.

2. Polymers and Slaking Additives

The following polymers were used in the processes for producing PCC described in examples 1 and 2:

P1: pMADQUAT; specific viscosity: 2.66

P2: 70% MADQUAT/30% MAPTAC; specific viscosity: 2.19

P3: 70% MADQUAT/30% MAPTAC; specific viscosity: 1.68

P4: pDADMAC; specific viscosity: 9.98

P5: polyacrylic acid with the following formula,

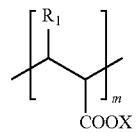

wherein $R_1$ is H, X is Na, and m=45; the $M_w$ being 4270 g/mol, and the polydispersity index being 2.3. The molecular weight $M_w$ and the polydispersity index are determined according to the corresponding method described in EP 14 166 751.9.

The following slaking additives were used in the processes for producing PCC described in examples 1 and 2:

A1: Sodium citrate (commercially available from Sigma-Aldrich, Germany),

A2: Natural sugar (commercially available from any consumer market),

3. Examples

Example 1

A milk of lime was prepared by mixing under mechanical stirring water with dry sodium citrate (A1) or sucrose (A2) as slaking additive (if present) and cationic polymer P1-P4 (if present) (according to the invention) or polymer P5 (comparison) at an initial temperature between 50 and 51° C. (the amounts of slaking additives and polymer are indicated in Table 2 below). Subsequently, calcium oxide (quicklime raw material from Golling, Austria) was added. The obtained mixture was stirred for 25 min and then sieved through a 200 μm screen.

The obtained milk of lime was transferred into a stainless steel reactor, wherein the milk of lime was cooled down to 50° C. Then the milk of lime was carbonated by introducing an air/$CO_2$ mixture (20 vol-% $CO_2$). During the carbonation step, the reaction mixture was stirred with a speed of 1 400 rpm. The kinetic of the reaction was monitored by online pH and conductivity measurements.

The characteristics of the prepared milks of lime and aqueous PCC suspensions are described in Tables 1 and 2 below.

TABLE 1

Characteristics of produced milks of lime of Example 1 (comp: comparative example; IN: inventive example).

| Sample | Polymer additive | Polymer amount [wt.-%/wt. CaO] | Slaking additive | Slaking additive amount [wt.-%/wt. CaO] | Solids content [wt.-%] |
|---|---|---|---|---|---|
| 1 (comp) | No | — | A1 | 0.1 | 15.7 |
| 2 (IN) | P1 | 0.15 | A1 | 0.1 | 25.2 |
| 3 (IN) | P1 | 0.25 | A1 | 0.1 | 32.9 |
| 4 (IN) | P1 | 0.15 | A2 | 0.1 | 28.6 |
| 5 (IN) | P2 | 0.15 | A1 | 0.1 | 25.0 |
| 6 (IN) | P3 | 0.15 | A1 | 0.1 | 24.9 |
| 7 (IN) | P4 | 0.15 | A1 | 0.1 | 25.5 |
| 8 (comp) | P5 | 0.15 | A1 | 0.1 | 25.0 |

TABLE 2

Characteristics of the obtained aqueous PCC suspensions of Example 1 (comp: comparative example). All samples had a calcite structure.

| Sample | Viscosity of the milk of lime (mPa · s) 100 rpm | Carbonation time (min/kg Ca(OH)$_2$) | Solids content of the PCC (wt.-%) | Viscosity of the PCC (mPa · s) 100 rpm | SSA [m$^2$/g] | d$_{50}$ [μm] | Zeta potential (mV) | Mütek charge (μVal/g of slurry) |
|---|---|---|---|---|---|---|---|---|
| 1 (comp) | 20 | 52 | 19.6 | 20 | 3.3 | 2.45 | +4.9 | −0.2 |
| 2 (IN) | 204 | 52.7 | 31.2 | 202 | 4.7 | 1.85 | +0.1 | +2.3 |
| 3 (IN) | 440 | 123 | 38.7 | 605 | 6.1 | 1.74 | | +4.2 |
| 4 (IN) | 450 | 105 | 33.2 | 232 | 6.0 | 1.89 | | +1.5 |
| 5 (IN) | 83 | 45.5 | 32.1 | 225 | 5.2 | 1.38 | +8.8 | +1.2 |
| 6 (IN) | 74 | 45.6 | 32.3 | 175 | 6.3 | 1.42 | +0.2 | +1.4 |
| 7 (IN) | 164 | 46.8 | 33.6 | 1380 | 4.9 | 1.41 | +30.5 | +3.8 |
| 8 (comp) | 294 | 46.0 | 37.2 | 573 | 5.0 | 1.30 | −10.5 | −0.9 |

The results compiled in Table 2 show that the use of a slaking additive alone leads to a suspension having a PCC content of only about 20 wt.-% (comparative sample 1).

In contrast, inventive samples 2 to 7 confirm that the viscosity of the obtained milk of lime and PCC suspension is totally in adequation with the intended use of the PCC so obtained that is to say suspensions of PCC having a Brookfield viscosity of less than or equal to 1 500 mPa·s at 25° C. Additionally, the kinetic of carbonation and the crystallographic structure of the prepared PCC (results not shown) is similar to the one obtained with a process involving the use of an anionic polymer (P8: polyacrylic acid where 100 mole-% of the carboxylic groups have been neutralized by sodium ions, the $M_w$ being 4270 g/mol, and the polydispersity index being 2.3; sample being outside of the invention).

Example 2

A milk of lime was prepared by mixing under mechanical stirring water with dry sodium citrate (A1) as slaking additive and a polymer at an initial temperature between 40 and 41° C. (the amounts of slaking additives and polymer as well as the used polymer type are indicated in Table 4 below). Subsequently, calcium oxide (quicklime raw material from Golling, Austria) was added. The obtained mixture was stirred for 25 min and then sieved through a 200 μm screen.

The obtained milk of lime was transferred into a stainless steel reactor, wherein the milk of lime was cooled down to 70° C. Then the milk of lime was carbonated by introducing an air/$CO_2$ mixture (20 vol-% $CO_2$). During the carbonation step, the reaction mixture was stirred with a speed of 1 400 rpm. The kinetic of the reaction was monitored by online pH and conductivity measurements.

The characteristics of the prepared milks of lime and aqueous PCC suspensions are described in Tables 3 and 4 below.

TABLE 3

Characteristics of produced milks of lime of Example 2 (comp: comparative example; IN: inventive example).

| Sample | Polymer additive | Polymer amount [wt.-%/wt. CaO] | Slaking additive | Slaking additive amount [wt.-%/wt. CaO] | Solids content [wt.-%] |
|---|---|---|---|---|---|
| 9 (IN) | P1 | 0.15 | No | — | 29.2 |

TABLE 3-continued

Characteristics of produced milks of lime of Example 2 (comp: comparative example; IN: inventive example).

| Sample | Polymer additive | Polymer amount [wt.-%/wt. CaO] | Slaking additive | Slaking additive amount [wt.-%/wt. CaO] | Solids content [wt.-%] |
|---|---|---|---|---|---|
| 10 (IN) | P1 | 0.15 | A1 | 0.1 | 28.9 |
| 11 (IN) | P1 | 0.25 | A1 | 0.1 | 29.7 |

TABLE 4

Characteristics of the obtained aqueous PCC suspensions of Example 2 (comp: comparative example; IN: inventive example).

| Sample | Viscosity of the milk of lime (mPa·s) 100 rpm | Carbonation time (min/kg Ca(OH)₂) | Solids content of the PCC (wt.-%) | Viscosity of the PCC (mPa·s) 100 rpm | SSA [m²/g] | $d_{50}$ [μm] | Zeta potential (mV) | Mütek charge (μVal/g of slurry) |
|---|---|---|---|---|---|---|---|---|
| 9 (IN) | 625 | 114 | 33.2 | 250 | 5.5 | 1.73 | | +1.5 |
| 10 (IN) | 690 | 97 | 34.4 | 143 | 5.7 | 1.91 | | +1.97 |
| 11 (IN) | 650 | 112 | 35.4 | 207 | 6.1 | 1.74 | | +1.8 |

The results given in Table 4 show that it is also possible to obtain PCC at high solids content at a reaction temperature of 70° C. The results also show that the PCC can be obtained by the sole use of the cationic polymer without the need of a slaking additive (sample 9).

The invention claimed is:

1. A process for producing an aqueous suspension of precipitated calcium carbonate comprising the steps of:
   i) providing a calcium oxide containing material, the calcium oxide containing material having a minimum calcium oxide content of at least 75 wt.-%, based on the total weight of the calcium oxide containing material,
   ii) providing at least one cationic polymer comprising monomer units, the at least one cationic polymer being a quaternized ammonium compound which consists of monomer units, the monomer units each being a quaternized ammonium compound,
   iii) preparing a milk of lime by mixing water, the calcium oxide containing material of step i), and the at least one cationic polymer of step ii) to obtain a milk of lime, wherein the calcium oxide containing material and the water are mixed in a weight ratio from 1:1 to 1:5, and wherein the at least one cationic polymer is present in an amount from 0.01 to 0.5 wt.-%, based on the total weight of the calcium oxide containing material, and
   iv) carbonating the milk of lime obtained in step iii) to form an aqueous suspension of precipitated calcium carbonate.

2. The process of claim 1, wherein step iii) comprises the steps of:
   a1) mixing the at least one cationic polymer of step ii) with water, and a2) adding the calcium oxide containing material of step i) to the mixture of step a1); or
   b1) mixing the calcium oxide containing material of step i), and the at least one cationic polymer of step ii), and b2) adding water to the mixture of step b1); or
   c) mixing the calcium oxide containing material of step i), the at least one cationic polymer of step ii) and water simultaneously.

3. The process of claim 1, wherein the process further comprises step v) of adding at least one slaking additive to process step iii).

4. The process of claim 3, wherein the at least one slaking additive is selected from the group consisting of organic acids, organic acid salts, sugar alcohols, monosaccharides, disaccharides, polysaccharides, gluconates, phosphonates, lignosulfonates, and mixtures thereof.

5. The process of claim 1, wherein the milk of lime obtained in step iii) has a Brookfield viscosity from 1 to 1,000 mPa·s at 25° C.; and/or the suspension of PCC obtained in step iv) has a Brookfield viscosity of less than or equal to 1,600 mPa·s at 25° C.

6. The process of claim 1, wherein the milk of lime obtained in step iii) has a Brookfield viscosity from 10 to 500 mPa·s at 25° C.; and/or the suspension of PCC obtained in step iv) has a Brookfield viscosity of less than or equal to 1,400 mPa·s at 25° C.

7. The process of claim 1, wherein the milk of lime obtained in step iii) has a solids content from 20 to 38 wt.-%, based on the total weight of the suspension.

8. The process of claim 1, wherein the suspension of PCC obtained in step iv) has a solids content from 24 to 42 wt.-%, based on the total weight of the suspension.

9. The process of claim 1, wherein the temperature of the water, which is used in mixing step iii), is adjusted to be in the range from more than 0° C. and less than 100° C.; and/or the temperature of the milk of lime obtained in step iii), which is employed in step iv), is adjusted to be in the range from 20° C. to 60° C.

10. The process of claim 1, wherein the calcium oxide containing material is calcium oxide.

11. The process of claim 1, wherein the at least one cationic polymer is:
   a) a homopolymer based on monomer units selected from the group consisting of vinyl-based dialkyl ammonium compounds, allyl-based dialkyl ammonium compounds, diallyldimethyl ammonium chloride (DADMAC), diallyldiethyl ammonium chloride (DADEAC), diallyldimethyl ammonium bromide (DADMAB), diallyldiethyl ammonium bromide (DADEAB); vinyl-based trialkyl ammonium compounds, [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); allyl-based trialkyl ammonium compounds, 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS), or
   b) a copolymer based on monomer and comonomer units selected from the group consisting of vinyl-based dialkyl ammonium compounds, allyl-based dialkyl ammonium compounds, diallyldimethyl ammonium chloride (DADMAC), diallyldiethyl ammonium chloride (DADEAC), diallyldimethyl ammonium bromide (DADMAB), diallyldiethyl ammonium bromide (DADEAB); vinyl-based trialkyl ammonium compounds, [2-(acryloyloxy)ethyl]trimethylammonium chloride (AETAC), [2-(acryloyloxy)ethyl]trimethylammonium methosulfate (AETAMS), 3-(acrylamidopropyl)-trimethylammonium chloride (APTAC), 3-(acrylamidopropyl)-trimethylammonium methosulfate (APTAMS); allyl-based trialkyl ammonium compounds, 2-(methacryloyloxy)-ethyltrimethylammonium chloride (MADQUAT), 2-(methacryloyloxy)-ethyltrimethylammonium methosulfate (METAMS), 3-(methacryloyloxy)-propyltrimethylammonium chloride or 3-(methacrylamidopropyl)-trimethylammonium chloride (MAPTAC), 3-(methacrylamidopropyl)-trimethylammonium methosulfate (MAPTAMS).

12. The process of claim 1, wherein the at least one cationic polymer is a homopolymer selected from poly (diallyldimethyl ammonium chloride) (pDADMAC) and poly(2-(methacryloyloxy)-ethyltrimethylammonium chloride) (pMADQUAT), or a copolymer based on monomer units selected from 2-(methacryloyloxy)-ethyltrimethylammonium chloride (MADQUAT) and comonomer units selected from 3-(methacrylamidopropyl)-trimethylammonium chloride (MAPTAC).

13. The process of claim 1, wherein the at least one cationic polymer has a specific viscosity in the range from 1.2 to 15.0; and/or a has a positive charge density in the range of from >0 µVal/g to +15 µVal/g.

14. The process of claim 1, wherein the process further comprises a step of separating the precipitated calcium carbonate from the aqueous suspension obtained in step iv).

15. The process of claim 1, wherein the calcium oxide containing material has a minimum calcium oxide content of at least 90 wt.-%, based on the total weight of the calcium oxide containing material.

* * * * *